United States Patent [19]

Langdon

[11] Patent Number: 5,211,043

[45] Date of Patent: May 18, 1993

[54] SPARE TIRE LOCKING DEVICE

[76] Inventor: James H. Langdon, 26688 Club Dr., Madera, Calif. 93638

[21] Appl. No.: 905,448

[22] Filed: Jun. 29, 1992

[51] Int. Cl.[5] .................. B62D 43/04; E05B 65/12
[52] U.S. Cl. .......................... 70/259; 224/42.25
[58] Field of Search ........................ 70/53-56, 70/30, 49, 230, 259, 260, 432, 437; 292/327; 224/42.21, 42.25

[56] References Cited

U.S. PATENT DOCUMENTS

| | | | |
|---|---|---|---|
| 1,612,420 | 12/1926 | Davis | 70/230 |
| 2,526,238 | 10/1950 | Kendall | 70/230 |
| 3,631,695 | 1/1972 | Velbert et al. | 70/432 |
| 3,990,182 | 11/1976 | Linder | 70/56 X |
| 4,506,528 | 3/1985 | Eberly | 70/54 X |
| 4,526,021 | 7/1985 | Princell | 70/259 X |
| 4,988,023 | 1/1991 | Heathcoat | 70/259 X |
| 5,077,995 | 1/1992 | Appelbaum | 70/259 |

FOREIGN PATENT DOCUMENTS

| | | | |
|---|---|---|---|
| 978765 | 12/1975 | Canada | 70/49 |
| 265943 | 9/1927 | United Kingdom | 70/259 |

Primary Examiner—Lloyd A. Gall
Attorney, Agent, or Firm—Leon Gilden

[57] ABSTRACT

An elongate cylindrical body includes a forward resiliently tipped conical end arranged for projection into a socket portion of a locking structure of a pickup truck, wherein the cylindrical body is arranged for jacking relative to the rear bumper of the vehicle to prevent unauthorized access to the jacking structure permitting release of an associated spare tire.

3 Claims, 4 Drawing Sheets

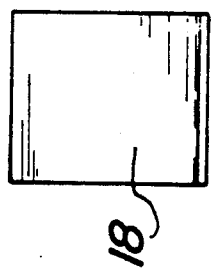
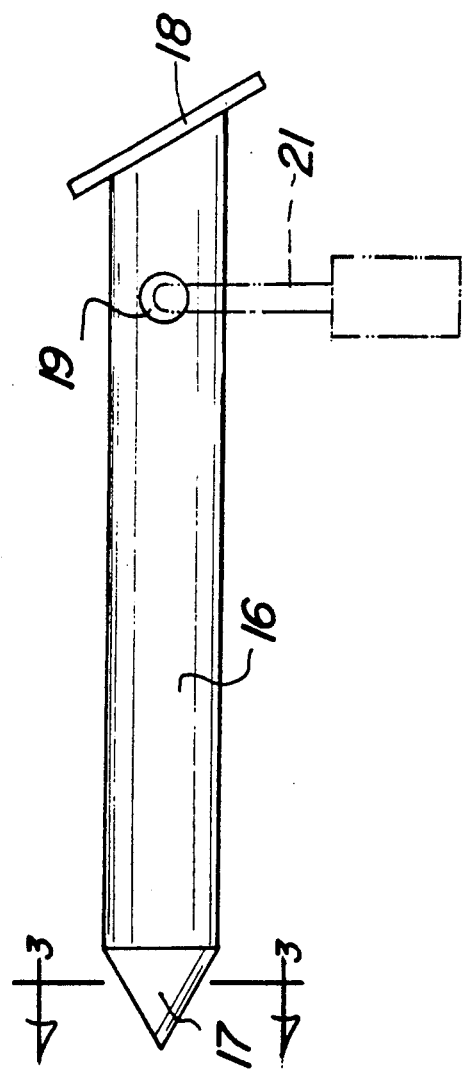
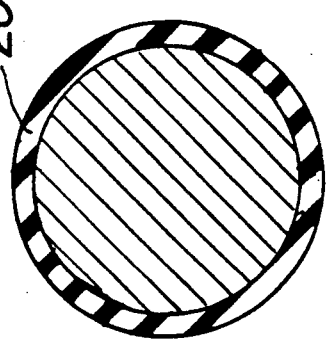

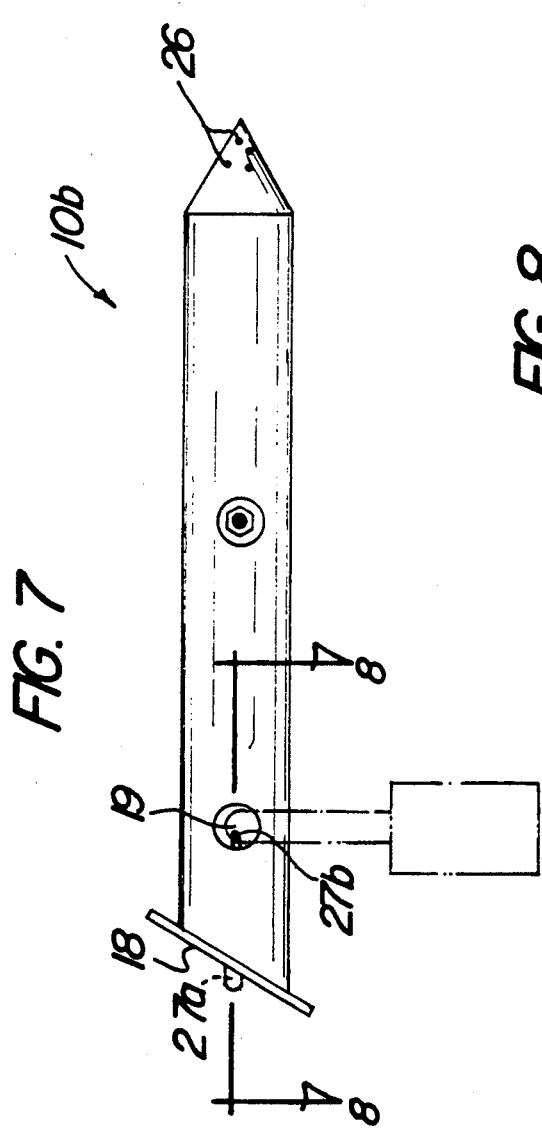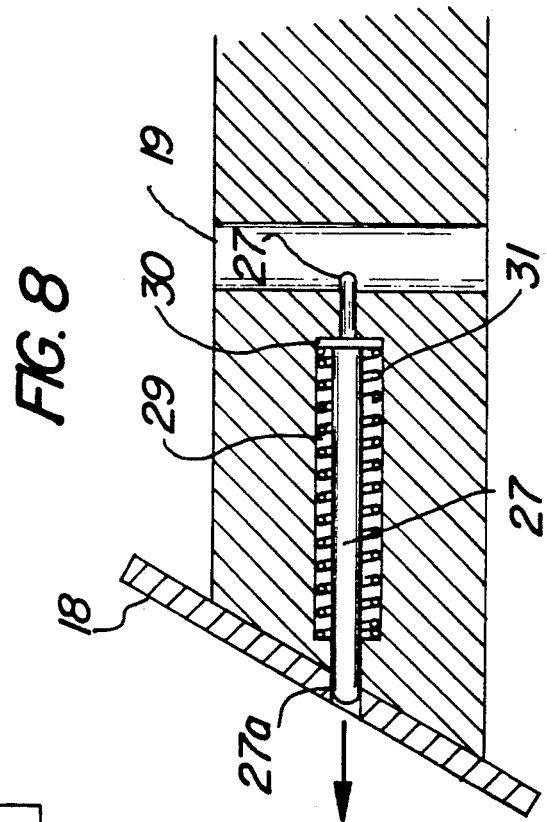

SPARE TIRE LOCKING DEVICE

BACKGROUND OF THE INVENTION

1. Field of the Invention

The field of invention relates to spare tire locking structure, and more particularly pertains to a new and improved spare tire locking device wherein the same is arranged to effect the selective plugging and rendering inoperative the jacking structure of a vehicle.

2. Description of the Prior Art

Late model pickup trucks, and particularly GENERAL MOTORS PICKUP TRUCKS, have been provided with a jacking arrangement having access to the jacking structure through a rear bore in the vehicular bumper. The instant apparatus is arranged to effect unauthorized access to the jacking structure during periods of non-use and storage of an associated spare tire. Prior art locking devices have heretofore not addressed this structure and such examples are set forth in U.S. Pat. Nos. 4,768,361; 4,765,164; 4,282,995; and 4,794,771.

U.S. Pat. No. 4,988,023 to Heathcot sets forth a spare tire carrier structure, wherein jacking structure is arranged and accessed through a rear bore as indicated, wherein such teaching is incorporated herein by reference.

Accordingly, it may be appreciated that there continues to be a need for a new and improved spare tire locking device as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of spare tire locking structure now present in the prior art, the present invention provides a spare tire locking device wherein the same is arranged to effect inaccessibility of a jacking structure of a pickup truck type vehicle. As such, the general purpose of the present invention, which will be described subsequently in greater detail, is to provide a new and improved spare tire locking device which has all the advantages of the prior art spare tire locking structure and none of the disadvantages.

To attain this, the present invention provides an elongate cylindrical body including a forward resiliently tipped conical end arranged for projection into a socket portion of a locking structure of a pickup truck, wherein the cylindrical body is arranged for jacking relative to the rear bumper of the vehicle to prevent unauthorized access to the jacking structure permitting release of an associated spare tire.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved spare tire locking device which has all the advantages of the prior art spare tire locking structure and none of the disadvantages.

It is another object of the present invention to provide a new and improved spare tire locking device which may be easily and efficiently manufactured and marketed.

It is a further object of the present invention to provide a new and improved spare tire locking device which is of a durable and reliable construction.

An even further object of the present invention is to provide a new and improved spare tire locking device which is susceptible of a low cost of manufacture with regard to both materials and labor, and which accordingly is then susceptible of low prices of sale to the consuming public, thereby making such spare tire locking devices economically available to the buying public.

Still yet another object of the present invention is to provide a new and improved spare tire locking device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic side view of the invention.

FIG. 3 is an orthographic view, taken along the lines 3—3 of FIG. 2 in the direction indicated by the arrows.

FIG. 4 is an orthographic end view of the locking device structure of the invention.

FIG. 7 is an orthographic side view of a further modified aspect of the invention.

FIG. 8 is an orthographic view, taken along the lines 8—8 of FIG. 7 in the direction indicated by the arrows.

DESCRIPTION OF THE PREFERRED EMBODIMENT

Figure 1:
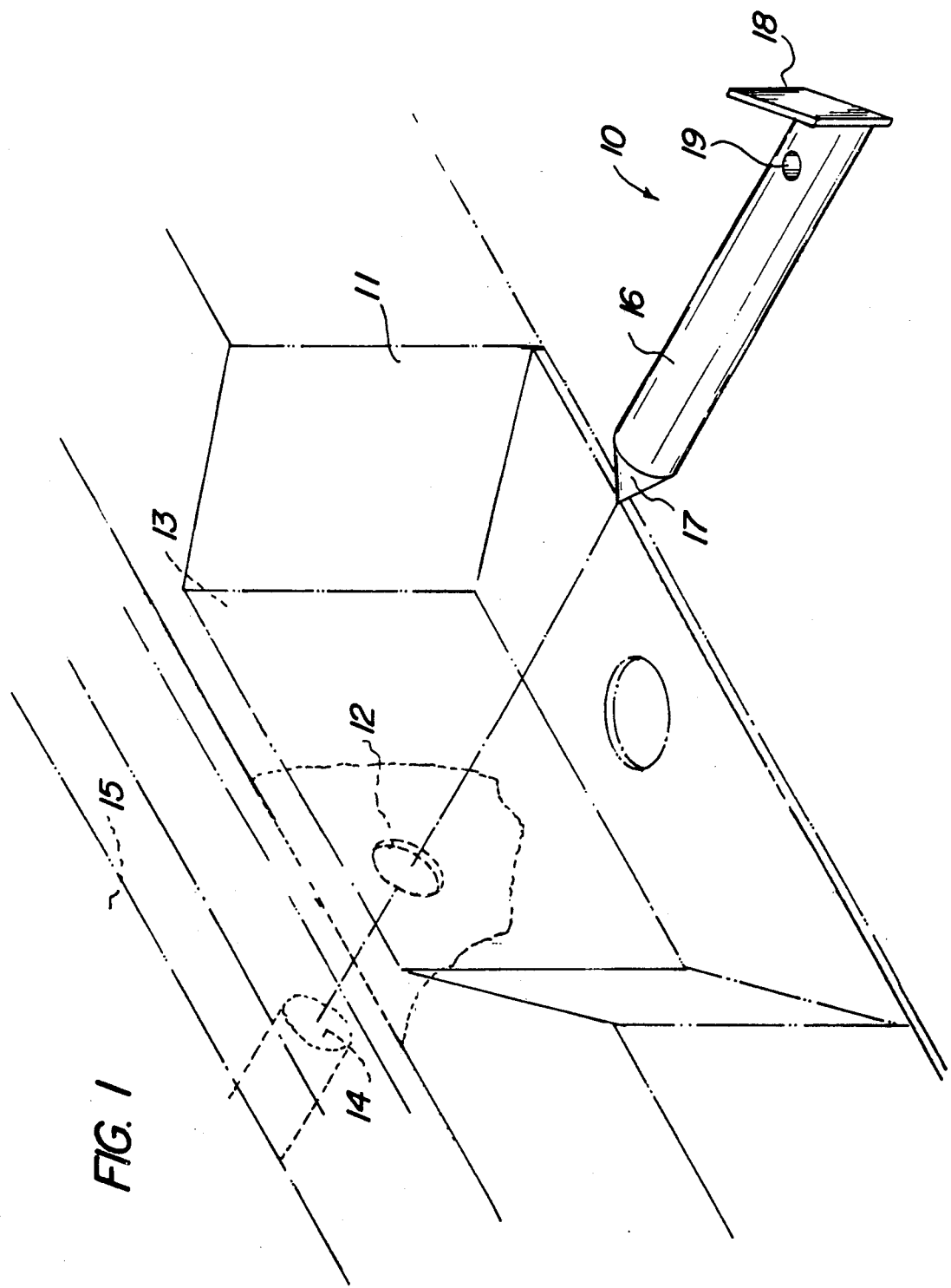
FIG. 1 is an isometric illustration of the instant invention.

With reference now to the drawings, and in particular to FIGS. 1 to 8 thereof, a new and improved spare tire locking device embodying the principles and concepts of the present invention and generally designated by the reference numerals 10, 10a, and 10b will be described.

Access to jacking structure of a spare tire arrangement as directed by this invention is set forth in prior art, as well as by the patent itself indicated in U.S. Pat. No. 4,988,023 incorporated herein by reference.

More specifically, the spare tire locking device 10 of the instant invention essentially comprises application to a vehicle having a vehicular bumper 11, including a bumper aperture 12 directed through a bumper vertical wall 13. A jack socket 14 is positioned below the associated truck bed floor 15, with the jack socket 14 coaxially aligned with the bumper aperture 12.

The device 10 of the invention essentially comprises cylindrical lock body 16 of rigid construction, having a conical forward end 17, formed with a forward end polymeric outer wall 20 (see FIG. 3). The body 16 includes an abutment plate 18 mounted to a rear distal end thereof in an integral relationship that is of a width substantially greater than a predetermined diameter of the body 16 to permit projection of the body 16 forwardly when the abutment plate 18 is in abutment with the vehicular bumper vertical wall 13. A lock receiving bore 19 is provided, wherein a lock member bar 21 is typically directed through the lock receiving bore 19 in adjacency to an interior surface of the bumper vertical wall 13 when the abutment plate 18 is in adjacency relative to an exterior surface of the bumper vertical wall 13 to thereby prevent either forward projection or unauthorized removal of the device 10 relative to the vehicular bumper 11. The polymeric outer wall 20 accordingly affords projection to the jack socket 14 when projected therewithin.

Figure 5:
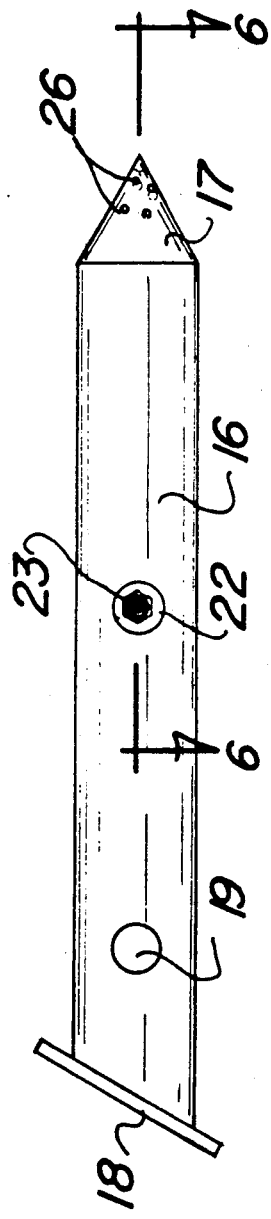
FIG. 5 is an orthographic side view of a modified aspect of the invention.
Figure 6:
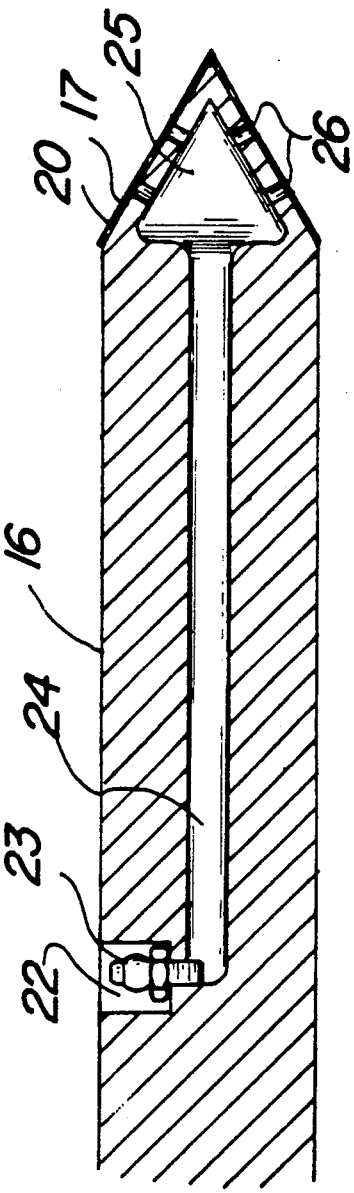
FIG. 6 is an orthographic view, taken along the lines 6—6 of FIG. 5 in the direction indicated by the arrows.

The apparatus 10a, as illustrated in FIGS. 5 and 6, includes a body cavity 22 having a grease fitting 23 positioned therewithin, with the grease fitting 23 positioned below an exterior surface of the cylindrical lock body 16. The grease fitting 23 is in fluid communication with a grease conduit 24 directed through the cylindrical body 16 terminating within the conical forward end 17 within a forward reservoir cavity 25 that in turn includes a plurality of outlet ports 26 in communication with the reservoir cavity 25, with the ports 26 directed through the conical forward end 17 to permit selective greasing and lubrication of the jack socket 14 minimizing corrosion and enhancing longevity thereof.

The FIGS. 7 and 8 indicate the further use of an indicator rod structure having an indicator rod body 27 defined by a predetermined first length slidably mounted, with an indicator rod bore 29 of a predetermined second length less than the first length of the indicator rod body 27. The indicator rod body 27 includes a body rear end 27a and a body forward end 27b. The indicator rod body 27 includes a flange plate 30 fixedly mounted to the rod body 27 within the rod body bore 29 having a spring 31 captured between the flange plate 30 and a first end wall of the rod body bore 29 in adjacency to the abutment plate 18. In this manner, typically the spring 31 biases the rod body 27, and more particularly the rod body forward end 27b into the lock receiving bore 19. When a lock member body bar is directed into the lock receiving bore 19, the indicator rod 27 is directed rearwardly against tensioning of the spring 31 to project the rod body rear end 27a exteriorly of the abutment plate 18, in a manner as indicated in FIG. 7, to indicate the presence of a lock structure through the lock receiving bore 19, as indicated in FIG. 7.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A spare tire locking device arranged for projection through a vehicular bumper aperture for reception within a jack socket, wherein the device comprises,
   an elongate cylindrical lock body, the lock body having a conical forward end, and
   an abutment plate integrally mounted to the body at a rear distal end of the body spaced from the conical forward end, and
   a lock receiving bore directed through the cylindrical lock body in spaced adjacency to the abutment plate, and
   the conical forward end includes a polymeric outer wall to prevent damage to the jack socket, and
   the cylindrical lock body includes an outer surface and a body cavity is directed into the cylindrical lock body extending from the outer surface into the cylindrical lock body, with a grease fitting positioned within the body cavity below the outer surface, and a grease conduit in fluid communication with the grease fitting directed through the cylindrical lock body extending into the conical forward end, and a plurality of outlet ports directed through the conical forward end, with the outlet ports in fluid communication with the grease conduit.

2. A locking device as set forth in claim 1 wherein the conduit forward end includes a forward reservoir cavity to provide for adequate volumetric flow of grease through the grease conduit into the outlet ports.

3. A locking device as set forth in claim 2 including an indicator rod body, and the indicator rod body defined by a predetermined first length, and an indicator rod bore is directed coaxially into the cylindrical lock body extending from the abutment plate forwardly into communication with the lock receiving bore, and the indicator rod bore defined by a predetermined second length less than the first length, the indicator rod body having a body rear end and a body forward end, and the indicator rod body including a rod flange plate fixedly mounted to the rod body in adjacency to the rod forward end, and a spring captured between the flange plate and a rearward end portion of the indicator rod bore.

* * * * *